United States Patent

[11] 3,611,824

| [72] | Inventor | Derek Norman Stevens<br>Dunstable, England |
|---|---|---|
| [21] | Appl. No. | 45,306 |
| [22] | Filed | June 11, 1970 |
| [45] | Patented | Oct. 12, 1971 |
| [73] | Assignee | General Motors Corporation<br>Detroit, Mich. |
| [32] | Priority | June 12, 1969 |
| [33] | | Great Britain |
| [31] | | 29,727/69 |

[54] WORM GEARING
5 Claims, 5 Drawing Figs.

[52] U.S. Cl.................................................. 74/411,
74/425, 74/434, 74/461
[51] Int. Cl....................................................F16h 57/00,
F16h 55/04, F16h 55/14
[50] Field of Search........................................... 74/411,
425, 434, 461

[56] References Cited
UNITED STATES PATENTS

| 3,535,948 | 10/1970 | Winzeler et al............. | 74/425 X |
| 3,406,583 | 10/1968 | Baier........................... | 74/411 |

Primary Examiner—Leonard H. Gerin
Attorneys—W. E. Finken and W. A. Schuetz

ABSTRACT: In order to overcome the disadvantage of insufficient ductility in glass filled nylon as a material for gear wheels, the teeth of a gear wheel are recessed below the dedendum circle so that each tooth is in effect supported on a long beam so that the additional resilience thereby obtained provides sufficient ductility to resist breakage of the teeth under high torque loads, the gear preferably being formed as two mouldings which are secured together, and the mouldings incorporating abutments to limit the relative movement of the teeth.

PATENTED OCT 12 1971

Inventor
Derek Norman Stevens
By W.A. Schuetz
Attorney

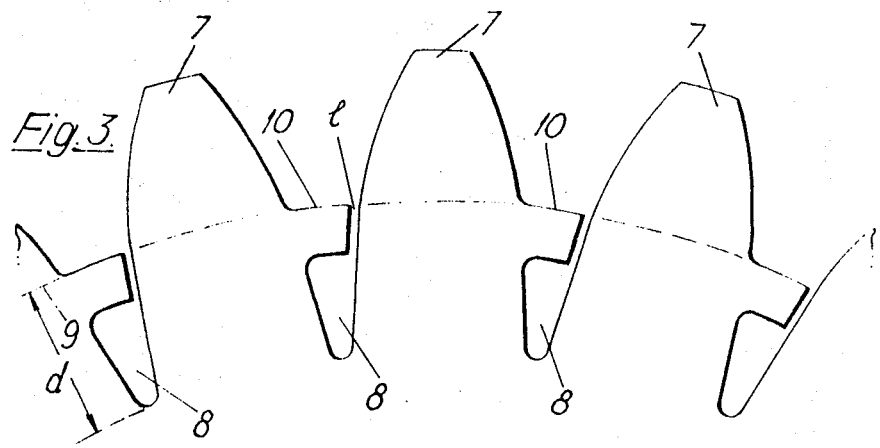
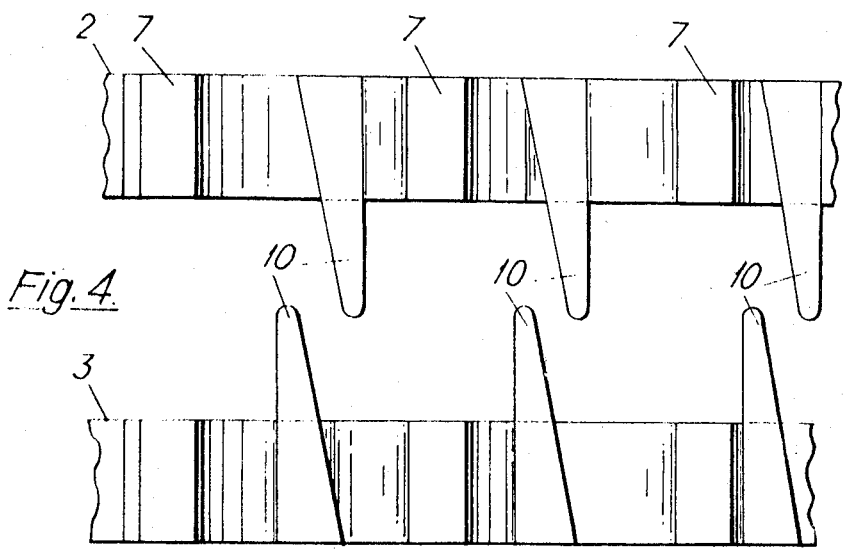
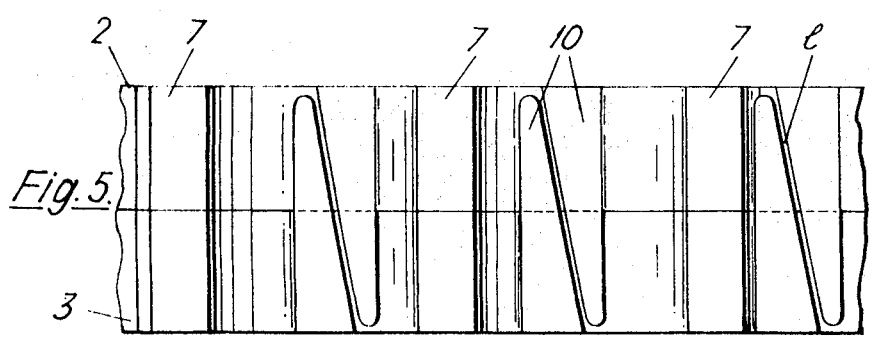

WORM GEARING

This invention relates to a gearing and although suitable in particular for worm wheels for worm gearing is also applicable to spur gears.

A gear wheel according to the present invention is suitable in particular for use in the gearing forming part of the drive mechanism of an electric windscreen wiper, but its use is dedendum confined to such constructions.

In a gear wheel according to this invention each tooth is separated from an adjacent tooth by a recess which extends radially inwards of the wheel for a substantial distance from the dedendum circle of the gear.

Said excess preferably tapers towards its inner extremity; and the radial depth of the recess may be greater than the depth of the teeth.

To limit the relative movement of adjacent teeth one or both of the faces of the recess may have an integral boss or like projection which extends towards but is spaced by a predetermined distance from an opposed surface of an adjacent tooth, relative movement of the adjacent teeth being prevented after the abutment of the boss with said surface.

The teeth are preferably made of a high tensile strength nonmetallic material, for example glass-filled nylon. Such materials are desirable for use in gearing in which silent running and low cost of gears is desirable, the glass-filled material accepting high torque stresses and being readily formed by injection moulding operations to give a gear of the desired configuration.

Glass-filled nylon has been found to be unsuitable as the material for the gear wheel, particularly a worm wheel, of normal construction since although it has a high tensile strength it is not sufficiently ductile to withstand the bending stresses on the teeth when the gearing is operated under high-torque stresses, the bending loads on the teeth causing the teeth to fracture.

With the construction according to the invention each tooth is in effect supported on a relatively long beam so that the additional resilience conferred by the length of the beam provides sufficient ductility to resist breakage of the teeth under high-torque loads, the desirable high-tensile strength properties of the material remaining unaffected.

The scope of the invention is defined by the appended claims; and the invention and the method by which it is to be performed are hereinafter particularly described with reference to the accompanying drawings in which:

FIG. 3 is an enlarged detail of one half of the gear wheel of FIG. 1;

FIG. 4 is a plan of FIG. 3; and

FIG. 5 is a plan similar to FIG. 4, but with the two halves of the gear assembled together.

Figure 2:
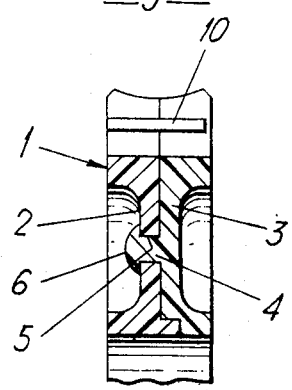
FIG. 2 is a section on the line II—II OF FIG. 1.

The drawings show a worm wheel 1 which is made of a high-tensile strength plastics material such as glass-filled nylon. As shown in FIG. 2, the gear 1 is formed as two complementary halves 2, 3 which are secured together by means of integral rivetlike projections 4 on one gear half 3 which are pressed through corresponding openings 5 in the other gear half 2 and are then deformed as at 6 so as to secure the two halves 2, 3 of the gear 1 together.

Figure 1:
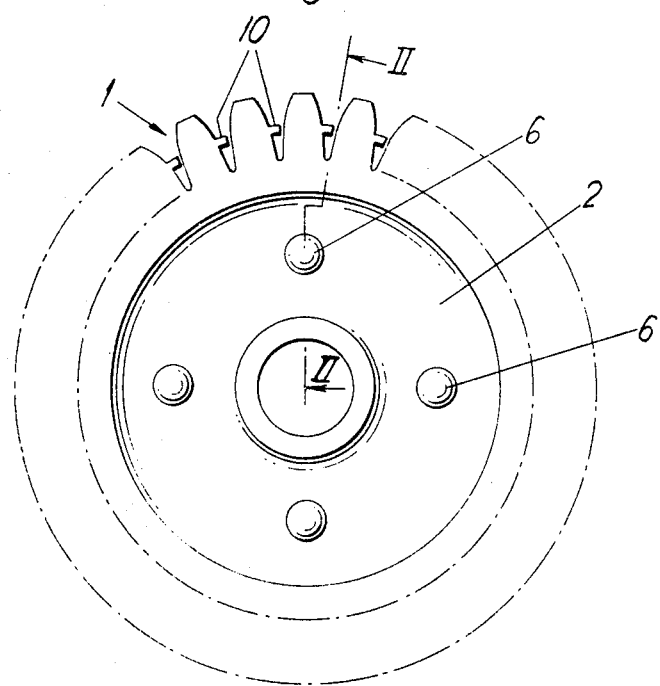
FIG. 1 is a side elevation of a gear wheel according to the invention.

As shown in FIGS. 1 and 3, each tooth 7 of the gear is separated from an adjacent tooth by a recess 8 which extends radially inwards of the gear wheel for a substantial distance $d$ from the dedendum circle 9 of the gear. As shown, the recess 8 tapers towards its inner extremity; and its radial depth $d$ may be greater than the depth if the teeth 7.

To limit the relative movement of adjacent teeth on face of the recess 8 of each half of the gear wheel 1 is formed with an integral boss 10 or like projection which extends towards but is spaced by a predetermined distance $b$ from an opposed surface of an adjacent tooth, relative movement of the adjacent teeth being prevented after the abutment of the boss with said surface.

As shown in FIGS. 4 and 5, when the gear is made in two halves 2, 3, each half has a projection 10, the projections being made of complementary tapered form and of a length substantially equal to the tooth width so that, when the two halves 2, 3 of the gear are secured together (FIG. 5) the gap $b$ between the opposed surface of the projections 10 of a pair of adjacent teeth 7 limit relative movement therebetween.

I claim:

1. A gear wheel formed of high tensile strength plastics, each tooth of the gear wheel being separated from an adjacent tooth by a recess which extends radially inwards of the gear wheel for a substantial distance from the dedendum circle of the gear wheel; at least one face of each said recess having a projection which is integral with a tooth and extends towards but is spaced by a predetermined distance from an opposed surface of an adjacent tooth so as to limit relative movement of adjacent teeth by the abutment of said projection with said opposed surface.

2. A gear wheel according to claim 1, formed in two halves having a junction substantially in the medial plane of the gear wheel, one said half of the gear wheel having rivetlike formations which are pressed fitted in complementary openings in the other half of the gear and are riveted over on to said other half to secure the two halves of the gear wheel together.

4. A gear wheel according to claim 2, in which said projection is integral with one half of a tooth but extends substantially the full width of the other half of the same tooth.

4. A gear wheel according to claim 3, in which there is a projection from each face of said recess, the projections being respectively integral with the halves of adjacent teeth which are on opposite sides of said medial plane.

5. A gear wheel according to claim 4, in which said projections are of complementary form tapering from one side face of the gear towards the other side face thereof.

PO-1050
(5/69)

UNITED STATES PATENT OFFICE
CERTIFICATE OF CORRECTION

Patent No. __3,611,824__   Dated __October 12, 1971__

Inventor(s) __Derek Norman Stevens__

It is certified that error appears in the above-identified patent and that said Letters Patent are hereby corrected as shown below:

Column 1, line 7 "dedendum" should read --not--; line 13, "excess" should read --recess--. Column 2, line 13, "if" should read --of--; line 14, "on" should read --one--; line 45, "4" should read --3--.

Signed and sealed this 4th day of April 1972.

(SEAL)
Attest:

EDWARD M. FLETCHER, JR.    ROBERT GOTTSCHALK
Attesting Officer          Commissioner of Patents